United States Patent [19]

Bowen

[11] Patent Number: 4,961,597
[45] Date of Patent: Oct. 9, 1990

[54] SEALING RING

[76] Inventor: Norman D. Bowen, 5 Queensborough Crescent, Weston, Ontario M9R 1A1, Canada

[21] Appl. No.: 375,634
[22] Filed: Jul. 5, 1989
[51] Int. Cl.⁵ .............................................. F16L 35/00
[52] U.S. Cl. ...................................... 285/24; 285/197; 285/349; 285/910; 285/261; 285/175
[58] Field of Search ................. 285/110, 24, 910, 349, 285/337, 261, 197, 198, 199, 332.3, 331, 175

[56] References Cited

U.S. PATENT DOCUMENTS

| 1,202,506 | 10/1916 | Gulloway | 285/110 X |
| 3,315,971 | 4/1967 | Sakurada | 285/110 X |
| 3,870,348 | 3/1975 | Hawkins | 285/197 |

FOREIGN PATENT DOCUMENTS 2381230 10/1978 France .................. 285/197
432578 12/1968 Italy ..................... 285/110

Primary Examiner—Dave W. Arola
Attorney, Agent, or Firm—Rogers, Bereskin & Parr

[57] ABSTRACT

A sealing ring for use in sealing a spigot and the like in an oversized hole is formed of resilient material and comprises a proximal portion, a distal portion and an intermediate seating portion. The proximal portion has an external diameter greater than the diameter of the hole and is adapted for location in a seating groove surrounding the spigot The distal portion has an external diameter between The diameters of the spigot and the hole and an internal diameter less than the spigot diameter and is adapted for location in the gap between the spigot and the hole. The intermediate seating portion is between the proximal and distal portions and tapers inwardly from the proximal portion to the distal portion such that the intermediate seating portion seats on the edge of the hole and centers the seal and spigot.

9 Claims, 2 Drawing Sheets

SEALING RING

FIELD OF INVENTION

This invention relates to sealing rings for use in sealably locating spigots in oversize holes.

The invention will be described with particular reference to use with spray nozzles, but is not limited to such applications.

BACKGROUND OF INVENTION

Spray nozzles are utilized in many areas where a spray of liquid is required: metal washing; foam control, asphalt spraying; vehicle washing; and dishwashers, to name but a few. In metal washing, one of the more popular forms of spray nozzles is the adjustable ball clip-on spray nozzle. These nozzles are mounted on tubular headers which have been drilled to provide a communicating hole and are secured to the headers by means of a springclip. The nozzles comprise a body and a nozzle ball. The body is provided with a spigot for extending into the header hole, surrounded by an o-ring receiving groove and a saddle shaped surround corresponding to the header surface around the hole. A bore extends through the body to a hemispherical chamber for accommodating the nozzle ball, which is retained in the chamber by a collar which engages external screw threads on the body.

A spring clip is pivotally attached to the body for retaining the nozzle on the header as, for example, when "phosphating" steel using spray nozzles the compounds in the phosphating fluid tend to precipitate out and collect in, and eventually obstruct, the nozzle. Using a spring clip, the nozzle may be easily replaced or removed for cleaning.

In metal washing a fluid pressure of approximately 20–30 lbs/in.$^2$ is used and it has been found that the resulting pressure force acting on the nozzle tends to push the nozzle off the header, thus reducing the effectiveness of the seal between the nozzle and header. This problem is more pronounced with nozzles of a larger diameter, as the effective area over which the pressure acts is substantially greater than with a nozzle which is only slightly smaller. Also, nozzles are currently manufactured with a variety of different spigot diameters and, if a customer wishes to use a smaller diameter nozzle, it is difficult to achieve a good seal between a nozzle spigot and the edge of an oversize header hole using existing o-ring seals.

SUMMARY OF THE INVENTION

According to the first aspect of the present invention there is provided a sealing ring for use in sealing a spigot and the like of a first diameter in an oversize hole of a second diameter. The sealing ring is formed of resilient material and comprises a proximal portion, a distal portion, and an intermediate seating portion. The proximal portion has an external diameter greater than the second diameter and is adapted for location surrounding a spigot. The distal portion has an external diameter between the first and second diameters and internal diameter lesser than the first diameter when the sealing ring is undeformed and is adapted for location in the gap between the spigot and the hole wall. The intermediate seating portion is located between the proximal and distal portions and tapers inwardly, from the proximal portion to the distal portion. The intermediate seating portion is adapted to seat on the edge of the oversized hole and center the seal and spigot in the hole.

The tapered form of the intermediate seating portion results in the formation of a seal of a diameter equal to the diameter of the hole. If the nozzle is located, for example, in a hole in a header supplying pressurized fluid to a spray nozzle, the effective pressure area of the nozzle is therefore approximately equal to the area of the hole. With a conventional cylindrical o-ring, this pressure area is bounded by the locus of the contact of the o-ring on the header. While the use of a cylindrical o-ring will likely only lead to a small increase in the effective pressure diameter, the pressure area and thus the force on the nozzle is proportional to the square of this diameter; a small increase in effective diameter results in a significant increase in the effective area.

In a second aspect of the present invention, there is provided a sealing ring for use in sealing a spigot and the like of a first diameter in an oversize hole of a second diameter formed in a cylindrical wall. The sealing ring is formed of a resilient material and comprises a proximal portion and a distal portion. The proximal portion has an external diameter greater than the second diameter and an internal diameter and is adapted for location surrounding a spigot. The distal portion has an external diameter between the first and second diameters and an internal diameter lesser than the first diameter when the sealing ring is undeformed and lesser than the internal diameter of the proximal portion, and is adapted for location in the gap between the spigot and the hole. The smaller internal diameter of the distal portion relative to the internal diameter of the proximal portion allows for accommodation of the deformation of the sealing ring to a saddle-like shape when sealing around the edge of the hole, while retaining the distal portion in sealing engagement with the spigot.

BRIEF DESCRIPTION OF THE DRAWINGS

A preferred embodiment of the invention will now be described, by way of example, with reference to the accompanying drawings, in which.

BRIEF DESCRIPTION OF PREFERRED EMBODIMENT

Figure 1:
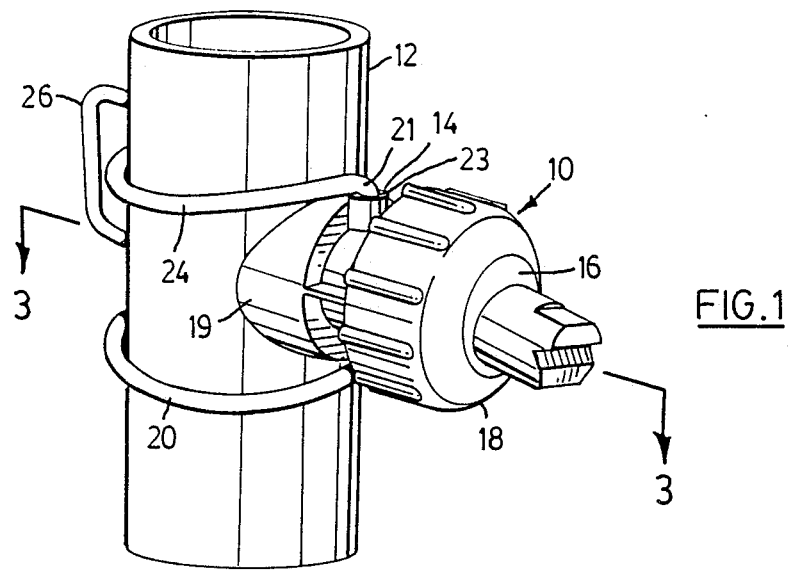
FIG. 1 is a perspective view of an adjustable ball clip-on nozzle mounted on a cylindrical header.

Reference is first made to FIG. 1 of the drawings, which is a perspective view of an adjustable ball clip-on spray nozzle 10 mounted on a cylindrical header 12. This form of nozzle will be used as an exemplary application for the sealing ring of the present invention and therefore a detailed description of the sealing ring will be preceded by brief description of a typical nozzle 10.

The nozzle 10 is formed of a suitable material such as plastic or stainless steel and comprises a body 14 having a through-passage in communication with the interior of the header 12 and a nozzle ball 16 adjustably mounted on the body 14 and retained on the body by a collar 18 which engages an external screw thread on the body 14. The body 14 has a base portion 19 which defines a saddle-like shape conforming to the external surface of the header.

A spring clip 20 is pivotally mounted on the body 14 for releasably retaining the nozzle on the header 12. The clip 20 is formed of a length of spring wire having two inwardly directed ends 21 (only one visible in FIG. 1) which engage recesses 23 on the side of the body, and defining a part circular header engaging portion 24 and an outwardly directed portion 26 which an operator may use to release the clip 20 from the header.

Figure 2:
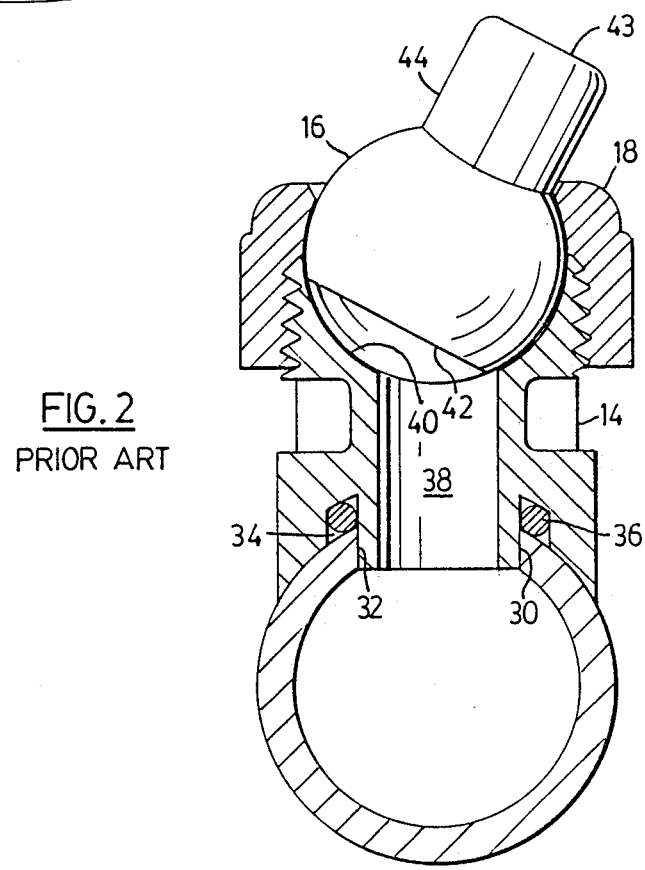
FIG. 2 is a sectional view corresponding to a view on line 3—3 of FIG. 1 and showing a prior art sealing ring.
Figure 3:
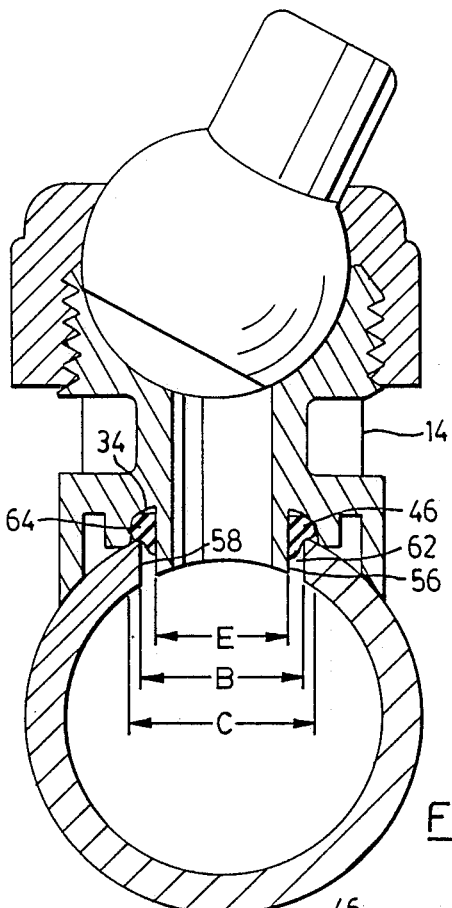
FIG. 3 is a sectional view on line 3—3 of FIG. 1 and showing a sealing ring in accordance with the present invention.

Reference is now made also to FIG. 2 of the drawings. FIG. 2 shows a spray nozzle provided with a prior art sealing ring, whereas FIG. 3 illustrates a sealing ring in accordance with the present invention. Both nozzles are substantially similar and will, for the most part, be described using the same terms and reference numerals.

A spigot 30 extends from the body 14 of the nozzle into a hole 32 provided in the header. Surrounding the spigot 30 is a groove 34 for receiving a sealing member and in the particular (prior art) example illustrated in FIG. 2, the sealing member is in the form of a resilient o-ring 36 (the sealing ring of FIG. 3 will be described in due course). A passageway 38 extends through the spigot 30 and into a semi-spherical chamber 40. The nozzle ball 16 is of complementary shape to the chamber 40 and movable therein and is provided with a central cavity 42 for communication with the passageway 38 throughout the range of movement possible for the nozzle ball. The actual nozzle spray outlet 43 is formed in a cylindrical post 44 which extends through the collar 18 and is provided with a particular end configuration, depending on the form of spray required.

During use the nozzle 10 is subject to a pressure force from the pressurized fluid within the header, the total force being calculated by the equation:

$$\text{pressure force} = p \cdot \pi \frac{(D + d)^2}{4} \text{ (approximately)}$$

where:
p=the pressure in the header
D=the o-ring outside diameter
d=the o-ring inside diameter It will be noted that the area is bounded by the locus of the contact of the o-ring 36 on the exterior wall of the header 12.

With larger sized spray nozzles, it has been found that the pressure forces acting on the nozzle are such that the integrity of the seal between the header and the nozzle is affected, leading to leakage of fluid past the exterior of the spigot.

Figure 4:
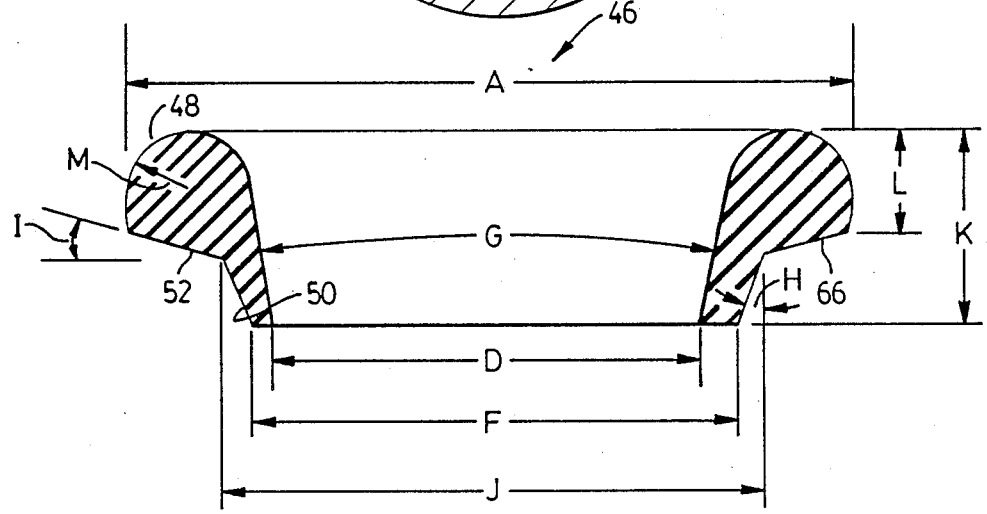
FIG. 4 is an enlarged sectional view of the sealing ring of FIG. 3 (on same sheet as FIG. 1).

FIGS. 3 and 4 of the drawings illustrate a sealing ring 46 in accordance with the preferred embodiment of the present invention which is intended to minimize these problems and also to permit the use of smaller diameter nozzle in oversize holes as have originally been provided for larger diameter nozzles. The sealing ring 46 is formed of a resilient material and comprises a proximal portion 48, a distal portion 50, and an intermediate seating portion 52. The FIG. 3 shows the sealing ring 46 fitted on a spray nozzle body 14 provided with a small diameter spigot 56 in an oversize hole 58. The body 14 includes a sealing ring seating groove 60 which accommodates the proximal portion 48 of the sealing ring, the distal portion 50 being located in the gap 62 between the spigot 56 and the hole 58, and the intermediate seating portion 52 engaging the proximal edge 64 of the hole.

The proximal portion 48 has an external diameter A greater than the diameter B of the hole 58 and slightly lesser than the diameter C of the groove 60. The side of the portion 48 directed towards the body 54 is preferably half circular in section.

The distal portion 50 is somewhat narrower than the proximal portion 48, and has an internal diameter D less than the external diameter E of the spigot 56, such that the portion 50 is normally in sealing engagement with the spigot 56. The external diameter F of the distal portion 50 is selected to lie between the external diameter E of the spigot and the internal diameter B of the hole. This permits the sealing ring 46, and thus also the spigot 56, to be easily introduced into the hole 58.

From the free end of the distal portion 50, the internal and external surfaces taper outwardly. In this particular example, the inner surface defines an angle $G = 18°$ and the external surface defines an angle $H = 17.8°$. The external surface continues until it meets the frusto-conical external surface of the intermediate seating portion 52, with angle $I = 15°$. The point of transition between the distal portion 50 and the intermediate seating portion 52 coincides as closely as possible with the edge 64 and is of diameter J. This reduces the effective area of the nozzle which is subject to pressure by the fluid in the header 12 to the are of the hole.

On the internal surface of the sealing ring, the outward taper which began at the distal portion 50 continues to the proximal portion 48. This taper permits the sealing ring to accommodate the deformation which results when the nozzle is mounted on the header; the edge of the hole defines a saddle-like shape and the sealing ring is thus deformed to define an elliptical shape in use.

In this particular example, the sealing ring 46 is formed of 60 durometer EPDM, through other resilient materials may be selected depending on environment and application.

In this particular example, the sealing ring is intended for use with a nozzle having a spigot diameter of 0.562" fitted in a 0.656" hole. The various dimensions of a suitable sealing ring are set out below and correspond to the diameters described above, and also further dimensions K, the overall height of the sealing ring, L, the combined height of the proximal and intermediate seating portions, and M, the radius of the proximal portion.

A=0.816 inches
D=0.504 inches
F=0.566 inches
J=0.620 inches
K=0.230 inches
L=0.120 inches
M=0.065 inches The sealing ring has been particularly described and illustrated with reference to use on a spigot for location in an oversize hole. However, the improved sealing characteristics of the sealing ring, when compared to conventional o-rings, may be utilized in applications where the spigot diameter is much closer in diameter to the hole. In these circumstances the thickness of the distal portion is reduced to coincide with the reduced size of the gap.

Thus it can be seen that the sealing ring described above provides and effective seal between the spigot and the hole edge, while reducing the effective pressure area of the spray nozzle and thus reducing the pressue force applied to the nozzle, and also allows for deformation of the sealing ring to conform with the shape of the hole edge.

I claim:

1. A sealing ring for use in sealing a substantially cylindrical section spigot and the like of a first diameter extending from a body of greater diameter than the spigot in a hole of a second diameter, means being provided to retain the spigot in the hole, the sealing ring being formed of resilient material and comprising:

a proximal portion having an external third diameter greater than said second diameter, an internal fourth diameter and a proximal face, the proximal portion being adapted for location surrounding the spigot with the proximal face abutting the body from which the spigot extends;

a distal portion having an external fifth diameter, an internal sixth diameter lesser than said first diameter when the sealing ring is undeformed, and a thickness lesser than the spacing between the spigot and the hole when the sealing ring is located on the spigot, the distal portion being adapted to engage the spigot and retain the sealing ring thereon; and an intermediate seating portion between the proximal and distal portions and tapering inwardly, at least on an external surface, from the distal portion to the proximal portion, wherein the intermediate seating portion is adapted to seat on the edge of the hole and to form a line contact, at least on initial contact therewith.

2. The sealing ring of claim 1 wherein said internal sixth diameter of the distal portion is lesser than the internal fourth diameter of the proximal portion to accomodate deformation of the seal when used to seal a spigot when the hole is in a non-planar surface.

3. The sealing ring of claim 2 in which the proximal face is half circular in cross-section.

4. The sealing ring of claim 1 wherein the distal portion tapers inwardly from the point of transition between the intermediate and distal portions to the external fifth diameter to facilitate location of the seal and, thus the spigot, in the hole.

5. A sealing ring in combination with a substantially cylindrical section spigot of a first diameter extending from a body of greater diameter than the spigot, the sealing ring for sealing the spigot in a hole of a second diameter having a sharp edge, means being provided for retaining the spigot in the hole, the sealing ring being formed of resilient material and comprising:

a proximal portion having an external third diameter greater than said second diameter, an internal fourth diameter and a proximal face, the proximal portion being adapted for location surrounding the spigot with the proximal face abutting the body from which the spigot extends;

a tapered distal portion having an external fifth diameter, an internal sixth diameter lesser than said first diameter when the sealing ring is undeformed, and a thickness lesser than the spacing between the spigot and the hole when the sealing ring is located on the spigot, the distal portion being adapted to engage the spigot and retain the sealing ring thereon and center the sealing ring and spigot in the hole; and an intermediate seating portion between the proximal and distal portions and tapering inwardly, at least on an external surface, from the distal portion to the proximal portion, wherein the intermediate seating portion is adapted to seat on the edge of the hole and to form a line contact at least on initial contact therewith.

6. A sealing ring in combination with a spray nozzle having a substantially cylindrical section spigot of a first diameter extending from a body of greater diameter than the spigot and having a groove for accomodating the sealing ring, and a header having a hole of a second diameter having a sharp edge, the sealing ring for sealing the spigot in the hole and constant force retaining means being provided to retain body on the header and the spigot in the hole, the sealing ring being formed of resilient material and comprising:

a proximal portion having an external third diameter greater than said second diameter, an internal fourth diameter and a proximal face, the proximal portion being adapted for location in the groove surrounding the spigot with at least the proximal face abutting the body from which the spigot extends;

a tapered distal portion having an external fifth diameter, an internal sixth diameter lesser than said first diameter when the sealing ring is undeformed, and a thickness lesser than the spacing between the spigot and the hole, the distal portion being adapted to engage the spigot and retain the sealing ring thereon and center the sealing ring and spigot in the hole; and an intermediate seating portion between the proximal and distal portions and tapering inwardly, at least one an outside surface, from the distal portion to the proximal portion, wherein the intermediate seating portion is adapted to seat on the edge of the hole to form a line contact at least on initial contact therewith.

7. The sealing ring of claim 6 wherein the external diameter of the sealing ring at the point of transition between the intermediate and distal portions is substantially similar to said second diameter.

8. A sealing ring for use in sealing a substantially cylindrical section spigot and the like of a first diameter extending from a body of greater diameter than the spigot in a hole of a second diameter formed in a cylindrical wall and in which means is provided to retain the spigot in the hole, the sealing ring being formed of resilient material and comprising:

a proximal portion having an external third diameter greater than said second diameter, an internal fourth diameter and a proximal face, the proximal portion being adapted for location surrounding the spigot with the proximal face abutting the body from which the spigot extends;

a tapered distal portion having an external fifth diameter between said first and second diameters, an internal sixth diameter lesser than said first and fourth diameters at least when the sealing ring is undeformed, and a thickness lesser than the spacing between the spigot and the hole when the sealing ring is located in the hole, the distal portion being adapted to engage the spigot and retain the sealing ring thereon and center the sealing ring and spigot in the hole; and an intermediate seating portion between the proximal and distal portions and tapering inwardly, at least on an external surface, from the distal portion to the proximal portion, wherein the intermediate seating portion is adapted to seat on the edge of the hole and to form a line contact at least on initial contact therewith, and the lesser diameter of the internal sixth diameter of the distal portion relative to the internal fourth diameter of the proximal portion permits for deformation of the sealing ring to a saddle-like shape when sealing the spigot in the hole.

9. method of sealing a substantially cylindrical section spigot and the like of a first diameter extending from a body of greater diameter than the spigot in a hole of a second diameter having a sharp edge comprising:

providing a sealing ring of resilient material and comprising a proximal portion having an external third diameter greater than said second diameter, an internal fourth diameter and a proximal face, a tapered distal portion having an external fifth diameter, an internal sixth diameter lesser than said first diameter, and an intermediate seating portion between the proximal and distal portions and tapering inwardly, at least on an outside surface, from the distal portion to the proximal portion; and extending at least the distal portion of the sealing ring to receive the spigot; and locating the sealing ring on the spigot with the proximal face abutting the body from which the spigot extends, wherein the distal portion engages the spigot and retains the sealing ring thereon and the extended distal portion has a thickness lesser than the spacing between the spigot and the hole; and locating the spigot and sealing ring in the hole, the distal portion centering the spigot and sealing ring in the hole, and seating the intermediate seating portion on the edge of the hole to form a line contact therewith; and further pressing the spigot and sealing ring into the hole to form a seal between the spigot and the sealing ring and between the sealing ring and the hole edge.

* * * * *